United States Patent Office 2,922,774
Patented Jan. 26, 1960

2,922,774

PROCESS FOR BULK POLYMERIZATION OF VINYLIDENE MONOMERS IN THE PRESENCE OF MONOMER-REACTIVE ORGANIC REDUCING AGENTS BY USE OF CERIC SALTS

Guido Mino, Plainfield, and Samuel Kaizerman, North Plainfield, N.J.

No Drawing. Application March 19, 1957
Serial No. 646,965

18 Claims. (Cl. 260—45.5)

This invention relates to a process for bulk polymerization of polymerizable compounds containing a $CH_2=C<$ group and to the products produced thereby. More particularly, this invention relates to the bulk polymerization of vinyl and/or vinylidene compounds by using an organic reducing agent and a ceric salt which is soluble in at least one component of the reaction medium in the substantially complete absence of any inert solvent and/or diluent.

One of the objects of the present invention is to produce polymeric materials by bulk polymerizing a vinyl and/or vinylidene compound by using certain organic reducing agents in combination with ceric salts in the absence of an inert solvent. A further object of the present invention is to produce a polymerization interreaction product in a bulk polymerization reaction comprising producing the polymerization interreaction product of a polymerizable vinyl and/or vinylidene monomer and certain organic reducing agents by using a ceric salt. These and other objects of the present invention will be discussed in greater detail hereinbelow.

Among the monomeric polymerizable compounds which may be used in the practice of the process of the present invention are those containing a polymerizable $CH_2=C<$ group. These monomeric materials should be liquid at the temperature of reaction. This includes vinylidene compounds and/or vinyl compounds. More specifically, the following polymerizable monomers may be used: styrene, and substituted styrenes such as ring-substituted and side-chain substituted styrenes, e.g., $\alpha$-chlorostyrene, $\alpha$-methyl styrene, and the like, o-methylstyrene, m-methylstyrene, p-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, or polymerizable acrylic compounds, such as acrylic acid and its homologues such as methacrylic acid, $\alpha$-chloroacrylic acid and the like and derivatives thereof such as the anhydrides, amides and nitriles, and the acrylic type acid esters of monohydric alcohols such as the methyl, ethyl, propyl, butyl, isobutyl, amyl, hexyl, cyclohexyl, heptyl, octyl, decyl alcohols or the acrylic type acid esters of nitro alcohols such as 3-nitro-2-butanol, 2-nitro-3-hexanol, 2-methyl-2-nitro-1-butanol and 2-nitro-2-methylpropyl alcohol, and the acrylic type acid esters of polyhydric alcohols such as ethylene glycol, diethylene glycol, glycerol, pentaerythritol, dipentaerythritol, propylene glycol, dipropylene glycol and the like. Additionally, one may make use of such polymerizable monomers such as butadiene, isoprene, and haloprenes such as chloroprene. Still further, as the polymerizable monomer, one may use allyl compounds, such as allyl alcohol or allyl or substituted allyl esters such as methallyl esters. More specifically, one may use allyl acetate, allyl propionate, allyl chloroacetate, allyl caproate, allyl linoleate, allyl benzoate, methallyl acetate, the allyl ester of isobutyric acid, allyl acrylate, diallyl carbonate, diallyl oxalate, diallyl phthalate, diallyl maleate, triallyl cyanurate and the like. Still further, one may make use of the vinyl or vinylidene esters such as vinyl acetate, vinyl chloride, vinylidene chloride, vinyl propionate, vinyl butyrate, and the like. Vinyl ethers may also be used such as vinylethylether, vinylpropylether, vinylisobutylether and the like or other vinyl compounds such as divinylsulfone, divinylsulfide, vinylpyridine and the like. Additionally, one may make use of the unsaturated polymerizable amides such as acrylamide, methacrylamide, and the like, or the nitriles such as acrylonitrile, methacrylonitrile, ethacrylonitrile, alpha-chloroacrylonitrile and the like. Whenever desirable, these polymerizable monomers may be used either singly or in combination with one another.

In the practice of the present invention, one makes use of an organic reducing agent which is capable of being oxidized by the ceric salt which is present in the system and which is capable of initiating the polymerization of the compound containing the $CH_2=C<$ group. These reducing agents may be either monomeric or polymeric. Fundamentally, these reducing agents may be an aldehyde, a mercaptan, a primary amine, a glycol, a carboxylic acid, a keto acid, and/or a derivative of a keto acid such as a keto ester and/or a keto amide.

Among the aldehydes which may be used in the practice of the process of the present invention are formaldehyde, paraformaldehyde, acetaldehyde, propionaldehyde, valeraldehyde, heptanal, or polymeric aldehydes such as paraldehyde, polyacrolein, poly-3-butenal, poly-3-pentenal, poly-5-chloro-3-pentenal, or copolymers prepared by polymerizing acrolein, 3-butenal, 3-pentenal, 5-chloro-3-pentenal and the like with other polymerizable materials containing the $CH_2=C<$ group such as those recited hereinabove.

Among the mercaptans which may be used in the practice of the process of the present invention are methyl mercaptan, ethyl mercaptan, n-propyl mercaptan, isopropyl mercaptan, 2-mercaptobutane, n-butyl mercaptan, n-decyl mercaptan, lauryl mercaptan, phenylethyl mercaptan, tertiary butyl mercaptan, tertiary amyl mercaptan, tertiary octyl mercaptan and the like. As polymeric reducing agents, one may make use of such polymeric mercaptans as polymercaptoethylacrylate, polymercaptobutylacrylate, polymercaptoethylmethacrylate, polymercaptopropylacrylate, polymercaptopropylmethacrylate, or copolymers of mercapto ethylacrylate, mercaptobutylacrylate, mercaptoethylacrylate, mercaptopropylacrylate, mercaptopropylmethacrylate and the like, with other polymerizable materials containing a polymerizable $CH_2=C<$ group as recited hereinabove.

Among the amines having primary amine groups which may be used in the practice of the process of the present invention are methylamine, ethylamine, propylamine, butylamine, octylamine, laurylamine, octadecylamine, ethylenediamine, trimethylenediamine, diethylenetriamine, tetraethylene pentamine, triethylene tetramine, hexamethylene tetramine, or the polymeric reaction products of any of the polyamines set forth hereinabove and the like, with a difunctional halohydrin such as epichlorohydrin, epibromohydrin, epiiodohydrin, epifluorohydrin, alpha, alpha'-dichlorohydrin, alpha,alpha'-dibromohydrin, alpha,alpha'-diiodohydrin, alpha,alpha'-difluorohydrin and the like. Whether monomeric or polymeric, the amine must contain at least one primary amine group.

Among the glycols which may be used in the practice of the process of the present invention are those which have hydroxy groups on vicinal carbon atoms such as ethylene glycol, 1,2-propylene glycol, pinacol, 1,2-butanediol, 2,3-butanediol, 3,4-hexanediol; 1,2-octanediol; phenyl ethylene glycol; 3-chloropropanediol-1,2; 2-methylpropanediol-1,2; 4-nitrobutanediol-1,2. Among the polymeric glycols having hydroxy groups on vicinal carbon atoms which may be used in the practice of the process of the present invention are polymers of glycerol monoacrylate, glycerol monomethacrylate, glycerol monoethacrylate, glycerol mono-chloroacrylate and the like.

Among the carboxylic acids which may be used in the practice of the process of the present invention are the monocarboxylic acids and the polycarboxylic acids such as acetic acid, propionic acid, butyric acid, lauric acid, caproic acid, caprylic acid, capric acid, myristic acid, pimelitic acid, stearic acid, arachidic acid, behenic acid, lignoceric acid, myristoleic acid, palmitoleic acid, oleic acid, linoleic acid, linolenic acid, oleostearic acid, licanic acid, ricinoleic acid, erucic acid, maleic acid, fumaric acid, aconitic acid, itaconic acid, malonic acid, succinic acid, glutaric acid, sebacic acid, adipic acid, pimelic acid, suberic acid, azelaic acid, tricarballylic acid, citric acid, tartaric acid, malic acid and the like.

Among the polymeric acid reducing agents which may be used in the practice of the process of the present invention are copolymers of alpha, beta-ethylenically unsaturated monocarboxylic or polycarboxylic acids, and when available, the anhydrides thereof, with polymerizable monomeric materials devoid of carboxylic acid groups. Among the alpha, beta-ethylenically unsaturated carboxylic acids which may be used are acrylic acid, methacrylic acid, ethacrylic acid, crotonic acid, maleic acid, fumaric acid, aconitic acid, itaconic acid and the like. These acids may be copolymerized to form a polymeric acid reducing agent with such polymerizable compounds as styrene, and the substituted styrenes such as listed hereinabove, vinyl acetate, methyl vinyl ether, the acrylates such as methyl acrylate, ethyl acrylate, methyl methacrylate, ethyl methacrylate, butadiene and the like.

Among the keto acids which may be used in the practice of the process of the present invention are acetoacetic acid; 3-oxopentanoic acid; 2-methyl-3-oxopentanoic acid; 3-oxohexanoic acid; 2-ethyl-3-oxohexanoic acid; 3-oxo-3-phenylpropanoic acid; 3-oxo-5-chlorohexanoic acid.

Among the keto acid derivatives which may be used are methyl acetoacetate, ethyl acetoacetate, n-butyl-3-oxopentanoate, benzyl acetoacetate, acetoacetanilide, acetoacetamide, N-acetoacetyl-o-chloroaniline, acetyl acetonitrile, 3-oxohexanenitrile.

These reducing agents, whether monomeric or polymeric, may be used either singly or in combination with one another whether they be of the same class or of different classes. For instance, one may make use of two or more aldehydes, two or more mercaptans, or one may make use of one or more primary amines with one or more glycols and/or one or more keto esters and the like.

The amount of reducing agent used in the practice of the process of the present invention may be varied over a very substantial range such as from about 0.01% to about 1000% or even more by weight based on the total weight of monomer and preferably from about 1% to about 300% of polymeric reducing agent by weight based on the total weight of the polymerizable monomer. When the monomeric reducing agents are used, even lesser amounts may be employed as a preferred embodiment such as from 0.01% to about 100% and preferably from about 0.1% to about 10% by weight based on the weight of the polymerizable monomer.

The amount of ceric salt which is utilized in the practice of the process of the present invention may be varied over fairly wide limits, for example, one may utilize from about $10^{-6}$ to about $10^{-2}$ mol of ceric ion per mol of polymerizable monomer. Preferably, one would use between about $10^{-3}$ to $10^{-2}$ mol of ceric ion per mol of polymerizable monomer. Among the ceric salts which may be used in the practice of the process of the present invention are ceric nitrate, ceric sulfate, ceric ammonium nitrate, ceric ammonium sulfate, ceric ammonium pyrophosphate, ceric iodate or the ceric salts of organic acids such as ceric naphthenate, ceric linoleate, ceric dihexyl sulfosuccinate, ceric dioctyl sulfosuccinate, ceric diheptyl sulfoglutarate, ceric didecyl sulfosuberate, ceric dilauryl sulfosebacate, ceric diamyl sulfomaleate, ceric dimethyl sulfofumarate, ceric dibutyl sulfodimethyl succinate, ceric dilauryl sulfomethyl glutarate and comparable organic ceric salts which may be produced by reacting inorganic ceric salts, such as ceric ammonium nitrate, with sodium salts of organic sulfur containing acids, either monobasic or polybasic, saturated or unsaturated, aliphatic or aromatic such as the mono and disulfosuccinate acids, sulfochlorsuccinic acid, sulfoadipic acid, sulfopyrotartaric acid, sulfoglutaric acid, sulfosuberic acid, sulfosebasic acid, sulfomaleic acid, sulfofumaric acid, sulfodimethyl succinic acid, sulfomethylglutaric acid, sulfopalmalinic acid, sulfopropylsuccinic acid, sulfooctylglutaric acid, or the alkyl esters of these sulfocarboxylic acids such as the methyl, ethyl, propyl, butyl, amyl, hexyl, octyl esters and the like. Additionally, organic ceric salts may be prepared be reacting ceric ammonium nitrate with the monoalkyl esters of sulfuric acid such as monobutyl acid sulfate, monoamyl acid sulfate, monooctyl acid sulfate, monolauryl acid sulfate and the like. Additionally, one may prepare organic ceric salts of the alkyl benzene sulfonic acids such as octyl benzene sulfonic acid, phenyl benzene sulfonic acid, decyl benzene sulfonic acid, dodecyl benzene sulfonic acid, octadecyl benzene sulfonic acid, isopropylnaphthalene sulfonic acid and the like. In the preparation of the organic salts, the organic sulfur containing acid materials are preferably used as alkali metal salts in reaction with the ceric ammonium nitrate to form the organic oil soluble ceric salts. The preferred alkali metal is sodium, although, others such as potassium, lithium and the like may be used. These organic oil-soluble organic salts are disclosed in considerable detail in our copending U.S. application having the Serial No. 628,212, filed December 14, 1956, of which the instant application is a continuation-in-part. In that application, we have disclosed and claimed a process for polymerizing vinyl and/or vinylidene monomeric materials in the presence of a ceric compound and an organic polymeric reducing agent in an aqueous media.

The instant application is additionally a continuation-in-part application of our earlier filed U.S. application having the Serial No. 623,556, filed November 21, 1956, which discloses and claims a process for the polymerization of vinyl and/or vinylidene compounds in an aqueous media in the presence of a ceric compound and certain monomeric organic reducing agents wherein the pH of the reaction system is maintained at 3.5 or below.

Each of these earlier cases are based on our parent application having the Serial No. 577,641, filed April 12, 1956, now abandoned, which disclosed and claimed the ceric ion polymerization of vinyl and/or vinylidene compounds in the presence of certain organic reducing agents.

In the practice of the process of the present invention, the conditions of reaction may be varied rather extensively, for instance, one may utilize temperatures from about −20° C. up to the boiling point of the system, namely, the reflux temperature, but it is desired for optimum results to avoid excessive thermal polymerization in favor of catalytic polymerization and, as a consequence, the preferred temperature range is between about +20° C. and about +60° C. Temperatures below 20° C. are effective but the polymerization time increases as the temperature diminishes. Pressure is not a factor in carrying out the instant process inasmuch as atmospheric pressure, super-atmospheric pressure or sub-atmospheric pressure may be utilized. Atmospheric pressure is preferred.

In order that the concept of the present invention may be more completely understood, the following examples are set forth in which all parts are parts by weight unless otherwise indicated. These examples are set forth primarily for the purpose of illustration and any specific

Example 1

Into a suitable reaction vessel equipped with thermometer and stirrer, there is introduced 5 parts of monomeric acrylonitrile, 0.1 part of pinacol and 0.1 part of ceric dihexylsulfosuccinate. The reaction system is maintained at 30° C. for a period of about 15 hours. The percent of conversion of monomer to polymer was 52.2%. A comparable reaction was carried out in precisely the same manner with respect to amounts, kind and conditions except that there was present no pinacol. After 15 hours, the conversion was 5.3%.

Example 2

Into a suitable reaction vessel equipped as in Example 1, there is introduced 5 parts of methyl methacrylate, 0.1 part of ethyl acetoacetate and 0.1 part of ceric dihexylsulfosuccinate. While holding the reaction system at about 30° C. with constant stirring for a 6 hour period, there is experienced a conversion of monomer to polymer amounting to 20.6%. An exactly comparable reaction, without benefit of any ethyl acetoacetate, converts only 6.2% of monomer to polymer.

Example 3

Into a suitable reaction vessel equipped as in Example 1, there is introduced 5 parts of vinylidene chloride, 0.1 part of decyl mercaptan and 0.1 part of ceric dihexylsulfosuccinate. The system is held at 30° C. for about 15 hours to give a yield of 14.2% of monomer converted to polymer. A comparable reaction, carried out, complete in every detail, except for the absence of the decyl mercaptan given in a 15 hour period, a yield of less than 0.1% conversion of monomer to polymer.

Example 4

Into a suitable reaction vessel equipped as before, there is introduced 5 parts of styrene, 0.1 part of ethyl acetoacetate and 0.1 part of ceric dihexylsulfosuccinate. With constant stirring, the charge is held at 30° C. for about 42 hours. The conversion of monomer to polymer is 25.4%. An exact duplicate experiment is carried out using no ethyl acetoacetate and after 42 hours at 30° C., the conversion of monomer to polymer is less than 0.1%.

Example 5

Into a suitable reaction vessel equipped as before, there is introduced 5 parts of acrylonitrile, 0.1 part of ceric dihexylsulfosuccinate and 0.1 part of azelaic acid. The charge is maintained at about 30° C. for about 5½ hours. The conversion of monomer to polymer is about 23%. The illustration is repeated in every detail except that the azelaic acid is omitted. After 5½ hours at 30° C., the conversion of monomer to polymer is 2.7%.

Example 6

Into a suitable reaction vessel equipped as before, there is introduced 5 parts of vinylidene chloride, 0.1 part of caprylic acid and 0.1 part of ceric dihexylsulfosuccinate. The system is held at about 30° C. for about 6 hours. The conversion of monomer to polymer is about 9.9%. The procedure is repeated in every detail except that the caprylic acid is omitted. After a 6 hour period at 30° C. the conversion of monomer to polymer is 0.4%.

Example 7

Into a suitable reaction vessel equipped as before, there is introduced 5 parts of methyl methacrylate, 0.1 part of acetic acid and 0.1 part of ceric dihexylsulfosuccinate. With constant stirring, the system is maintained for 5 hours at about 30° C. The conversion of monomer to polymer is 12.7%. This procedure is repeated in every detail except that the acetic acid is omitted. After 5 hours at 30° C., the conversion of monomer to polymer is 4.3%.

Example 8

Into a suitable reaction vessel equipped as before, there is introduced 5 parts of acrylonitrile and 0.1 part of n-butylamine. The charge is stirred to accomplish solution and the chamber is flushed thoroughly with nitrogen. Thereafter, there is introduced 0.1 part of ceric diamyl sulfosuccinate. The polymerization is carried out for about 8 hours at 30° C. The resulting pasty mass is dispersed in acetone and the polymer is separated by filtration. The yield is 0.9 part which represents a comparison of monomer to polymer of 18%.

Example 9

Into a suitable reaction vessel equipped as before, there is introduced 10 parts of ethyl methacrylate and 0.2 part of propionaldehyde. After thorough agitation, the system is flushed with carbon dioxide. The temperature of the system is adjusted to about 25° C. whereupon there is added 0.2 part of ceric lauryl sulfate. The polymerization is carried out for about 12 hours at this temperature. The polymer is isolated by precipitation in a 50–50 methanolhexane solution. The yield of polymer is 2.2 parts.

Example 10

A copolymer is prepared by reacting 11.2 parts of acrolein and 14.8 parts of vinyl acetate by introducing the same into a pressure reactor which is flushed with nitrogen in the presence of 70 parts of methanol, 70 parts of benzene and 0.75 part of $\alpha,\alpha'$-azodiisobutyronitrile. The charge is heated for 60 hours at 60° C. and the solvent is removed by distillation to give a yield of 6.6 parts of a copolymer of acrolein and vinyl acetate. One part of the copolymer thus produced is dissolved in 5 parts of monomeric acrylonitrile. The solution is introduced into a reaction sphere as before and after flushing with nitrogen, there is introduced 0.1 part of ceric dihexyl sulfosuccinate. Polymerization is carried out for 15 hours at 0 to 3° C. The resulting polymeric paste is dispersed in an excess of a 50–50 solution of methanolacetone at 5° C. The polymer is then separated by filtration. The yield is 1.9 parts.

The polymeric reaction products produced in accordance with the present invention will find applicability in a plurality of applications. For instance, one may use these polymeric reaction products as adhesives, molding compositions, laminating compositions, potting compositions or in the treatment of various materials such as in the treatment of textile materials made up of natural and/or synthetic fibers including wool, linen, cotton, nylon, and other synthetics produced from super-polyamides or polyesters, or in the treatment of paper or paper pulp or in the treatment of wood or leather. Additionally, these polymeric reaction products may be used to form synthetic fibers by use of a conventional extrusion technique. Films may be made from the polymeric reaction products of the present invention either of the self-supporting class or those which are bonded to a substrata as in the instance of coatings, paints and the like. Still further, these polymeric reaction products can be used in printing inks or in the insulation coating of wires and other electrical parts.

We claim:

1. A process for bulk polymerization comprising polymerizing a polymerizable monomeric compound containing a polymerizably reactive $CH_2=C<$ group in the presence of a ceric salt, which is soluble in at least one component of the reaction medium, and an organic reducing agent which is capable of being oxidized by said ceric salt and which is capable of initiating said polymerization, in the absence of any inert solvent.

2. A process for bulk polymerization comprising polymerizing a polymerizably reactive monomeric compound containing a polymerizable $CH_2=C<$ group in the presence of a ceric salt, which is soluble in at least one component of the reaction medium, and a monomeric organic reducing agent which is capable of being oxidized by said ceric salt and which is capable of initiating said polymerization, in the absence of any inert solvent.

3. A process for bulk polymerization comprising polymerizing a polymerizably reactive monomeric compound containing a polymerizable $CH_2=C<$ group in the presence of a monomeric glycol and a ceric salt, which is soluble in at least one component of the reaction medium, in the absence of any inert solvent.

4. A process for bulk polymerization comprising polymerizing a polymerizably reactive monomeric compound containing a polymerizable $CH_2=C<$ group in the presence of 1,2-propylene glycol and a ceric salt, which is soluble in at least one component of the reaction medium, in the absence of any inert solvent.

5. A process for bulk polymerization comprising polymerizing methyl methacrylate in the presence of a ceric salt, which is soluble in at least one component of the reaction medium, and in the presence of 1,2-propylene glycol, in the absence of any inert solvent.

6. A process for bulk polymerization comprising polymerizing a polymerizably reactive monomeric compound containing a polymerizable $CH_2=C<$ group in the presence of a monomeric primary amine and a ceric salt, which is soluble in at least one component of the reaction medium, in the absence of any inert solvent.

7. A process for bulk polymerization comprising polymerizing a polymerizably reactive monomeric compound containing a polymerizable $CH_2=C<$ group in the presence of n-butyl amine and a ceric salt, which is soluble in at least one component of the reaction medium, in the absence of any inert solvent.

8. A process for bulk polymerization comprising polymerizing acrylonitrile in the presence of n-butyl amine and a ceric salt, which is soluble in at least one component of the reaction medium, and in the absence of any inert solvent.

9. A process for bulk polymerization comprising polymerizing a polymerizably reactive monomeric compound containing a polymerizable $CH_2=C<$ group in the presence of a monomeric mercaptan and a ceric salt, which is soluble in at least one component of the reaction medium, in the absence of any inert solvent.

10. A process for bulk polymerization comprising polymerizing a polymerizably reactive monomeric compound containing a polymerizable $CH_2=C<$ group in the presence of n-decylmercaptan and a ceric salt, which is soluble in at least one component of the reaction medium, in the absence of any inert solvent.

11. A process for bulk polymerization comprising polymerizing styrene in the presence of n-decylmercaptan and a ceric salt, which is soluble in at least one component of the reaction medium, and in the absence of any inert solvent.

12. A process for bulk polymerization comprising polymerizing a polymerizably reactive monomeric compound containing a polymerizable $CH_2=C<$ group in the presence of a monomeric carboxylic acid and a ceric salt, which is soluble in at least one component of the reaction medium, in the absence of any inert solvent.

13. A process for bulk polymerization comprising polymerizing a polymerizably reactive monomeric compound containing a polymerizable $CH_2=C<$ group in the presence of caprylic acid and a ceric salt, which is soluble in at least one component of the reaction medium, in the absence of any inert solvent.

14. A process for bulk polymerization comprising polymerizing vinylidene chloride in the presence of caprylic acid and a ceric salt, which is soluble in at least one component of the reaction medium, and in the absence of any inert solvent.

15. A process for bulk polymerization comprising polymerizing a polymerizably reactive monomeric compound containing a polymerizable $CH_2=C<$ group in the presence of a polymeric aldehyde and a ceric salt, which is soluble in at least one component of the reaction medium, in the absence of any inert solvent.

16. A process for bulk polymerization comprising polymerizing a polymerizably reactive monomeric compound containing a polymerizable $CH_2=C<$ group in the presence of a copolymer of acrolein and a different polymerizable compound containing a $CH_2=C<$ group and a ceric salt, which is soluble in at least one component of the reaction medium, in the absence of any inert solvent.

17. A process for bulk polymerization comprising polymerizing a polymerizably reactive monomeric compound containing a polymerizable $CH_2=C<$ group in the presence of a copolymer of vinyl acetate and acrolein and a ceric salt, which is soluble in at least one component of the reaction medium, and in the absence of any inert solvent.

18. A process for bulk polymerization comprising polymerizing acrylonitrile in the presence of a copolymer of vinyl acetate and acrolein and a ceric salt which is soluble in at least one component of the reaction medium and in the absence of any inert solvent.

References Cited in the file of this patent

UNITED STATES PATENTS

| 2,396,997 | Fryling | Mar. 19, 1946 |
| 2,416,461 | Stewart | Feb. 25, 1947 |
| 2,485,535 | Park | Oct. 18, 1949 |
| 2,594,560 | Howard et al. | Apr. 29, 1952 |

FOREIGN PATENTS

| 440,173 | France | Apr. 26, 1912 |

OTHER REFERENCES

Bovey et al.: "Emulsion Polymerization," pages 80–81, published by Interscience Pub., New York (1955).

Bacon: Trans. Faraday Soc., volume 42, pages 140–155 (1946).

UNITED STATES PATENT OFFICE
CERTIFICATE OF CORRECTION

Patent No. 2,922,774　　　　　　　　　　　　　　　　January 26, 1960

Guido Mino et al.

It is hereby certified that error appears in the printed specification of the above numbered patent requiring correction and that the said Letters Patent should read as corrected below.

Column 6, line 70, for "hulk" read -- bulk --; lines 70, 71, and 72, claim 2, column 7, lines 3, 4, and 5, claim 3, lines 9, 10, and 11, claim 4, lines 20, 21, and 22, claim 6, same column 7, lines 26, 27, and 28, claim 7, lines 37, 38, and 39, claim 9, lines 43, 44, and 45, claim 10, lines 54, 55, and 56, claim 12, column 8, lines 4, 5, and 6, claim 13, lines 15, 16, and 17, claim 15, lines 21, 22, and 23, claim 16, and lines 29, 30, and 31, claim 17, for "A process for bulk polymerization comprising polymerizing a polymerizably reactive monomeric compound containing a polymerizable", each occurrence, read -- A process for bulk polymerization comprising polymerizing a polymerizable monomeric compound containing a polymerizably reactive --.

Signed and sealed this 26th day of July 1960.

(SEAL)
Attest:

KARL H. AXLINE　　　　　　　　　　　　　　　　ROBERT C. WATSON
Attesting Officer　　　　　　　　　　　　　　　Commissioner of Patents